United States Patent

Shimizu

[11] Patent Number: 6,148,341
[45] Date of Patent: *Nov. 14, 2000

[54] SYSTEM FOR ESTABLISHING MULTIMEDIA COMMUNICATION INTERCONNECTION BETWEEN LOCAL UNMANNED AUTOMATIC CONTRACT MACHINES WITH A CENTER TERMINAL

[75] Inventor: Seiji Shimizu, Tokyo, Japan

[73] Assignee: Oki Electric Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/929,667

[22] Filed: Sep. 15, 1997

[30] Foreign Application Priority Data

Feb. 27, 1997 [JP] Japan ................................ 9-043503

[51] Int. Cl.[7] ........................ G06F 15/173; G06F 15/16
[52] U.S. Cl. ...................... 709/225; 709/226; 709/227; 709/229; 709/238; 709/250
[58] Field of Search .......................... 395/200.3, 200.53, 395/200.59, 200.32, 712, 650, 200.09; 707/1, 10, 4; 709/225, 226, 227, 229, 238, 250

[56] References Cited

U.S. PATENT DOCUMENTS

| | | | |
|---|---|---|---|
| 5,249,290 | 9/1993 | Heizer | 395/650 |
| 5,526,492 | 6/1996 | Ishida | 395/200.09 |
| 5,603,058 | 2/1997 | Belknap et al. | 710/35 |
| 5,712,988 | 1/1998 | Khaira | 395/293 |
| 5,742,762 | 4/1998 | Scholl et al. | 395/200.3 |
| 5,742,772 | 4/1998 | Sreenan | 395/200.56 |

*Primary Examiner*—Le Hien Luu
*Attorney, Agent, or Firm*—Venable; Robert J. Frank; Allen Wood

[57] ABSTRACT

A method for establishing multimedia communication connection between a plurality of terminals 2 and one center terminal 1 in such a manner that the center terminal 1 has a plurality of relay resources 12, so that when an inquiry is made by any of the terminals 2 for connection, it returns connection-destination information of a relay resource 12 to be connected. Based on the connection-destination information, the terminal 2 makes an access to the center terminal 1 via the assigned relay resource 12, thus establishing multimedia communication connection there between. As a result, there is no need to provide one center terminal for each client terminal, thereby reducing the hardware introduction cost and the installation space required.

22 Claims, 7 Drawing Sheets

SYSTEM FOR ESTABLISHING MULTIMEDIA COMMUNICATION INTERCONNECTION BETWEEN LOCAL UNMANNED AUTOMATIC CONTRACT MACHINES WITH A CENTER TERMINAL

BACKGROUND OF THE INVENTION

The present invention relates in general to a method for establishing multimedia communication interconnection and more particularly to a method for establishing multimedia communication interconnection in an unmanned automatic contract reception system.

Recently, in Japan, Korea, and other Asian countries, unmanned automatic contract machines have been highly evaluated by the users as new financial service in the multimedia age. This is probably because of their highly functional and user-friendly operability and consideration of users' privacy. The enterprise side also can enjoy various advantages, because they can largely save personnel expenses and do not have to start large shops but only small ones used exclusively for unmanned automatic contract reception, to capture clients. With this, demands for the unmanned automatic contract machine are expected to increase more and more all over the world.

An unmanned automatic contract reception system generally comprises a terminal operated by the clients (hereinafter called the client terminal) and a terminal manipulated by the operator at the host enterprise (hereinafter called the center terminal).

The center terminal is used for the following cases:

(1) The case where a operator sends contract application forms etc. read in with the scanner at a client terminal to the center terminal to display them and then visually checks them for appropriate entry and proper read-in.

(2) The case where the operator collates a picture on an identification (ID) card of the client's driver's license etc. read in with the scanner at a client terminal with the image of the client himself taken with a camera at the client terminal, thus checking his identification.

(3) The case where the operator enters the examination results.

On the other hand, the interconnection between the client terminal and the center terminal comes in the following forms:

(1) For interconnection, both the client terminal and the center terminal are installed in the same branch.

(2) Each client terminal is installed in a far distant unmanned shop, to be connected to the center terminal via a communication line.

(3) To allow the local center etc. to conduct examination collectively, the concerned center terminals are all installed in that local center and connected to each of the client terminals via a communication line.

In the above-mentioned form (2) of the interconnection form for unmanned automatic contract reception systems, the client terminal and the center terminal have been installed in a relationship of 1:1 conventionally. With this form (2), each client goes ahead with a procedure for his contract against the description on the display at a client terminal, during which the operator at the center terminal has to, for example, check the information read in with the scanner or enter the examination results as occasion demands.

With this interconnection for (2), therefore, the operator at a center terminal must be always waiting for the occasional jobs until the client finishes his procedure for contract, thus deteriorating the operator's job efficiency. Also, each client terminal requires a center terminal, increasing the hardware-related introduction expenses and the installation space required.

SUMMARY OF THE INVENTION

To solve the above-mentioned problems with the conventional unmanned automatic contract reception systems, an object of the present invention is to propose a method for establishing such a novel and improved multimedia communication interconnection system that one center terminal can cope with a plurality of client terminals, to reduce the hardware-related introduction expenses and decrease the installation space.

Another object of the present invention is to propose a method for establishing such a novel and improved multimedia communication interconnection system that the center terminal can cope with a plurality of client terminals, to improve the operator's job efficiency.

To solve the above-mentioned problems specifically, in establishing multimedia communication interconnection between one center terminal and a plurality of client terminals, first the present invention permits the center terminal to receive an inquiry for connection from one of the client terminals and then send it back the connection-destination information of the relay resources to be assigned. Then, based on the connection-destination information, that client terminal makes an access to the center terminal via the assigned relay resources. Such construction enables the establishment of multimedia communication interconnection between one center terminal and a plurality of client terminals.

Other objects, features, and advantages of the present invention will become apparent from the following detailed description and the accompanying drawings.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

In the drawings.

DESCRIPTION OF THE PREFERRED EMBODIMENTS

Preferred embodiments of the present invention for the method for establishing multimedia communication interconnection will be detailed as follows with reference to the accompanying drawings.

Figure 1:
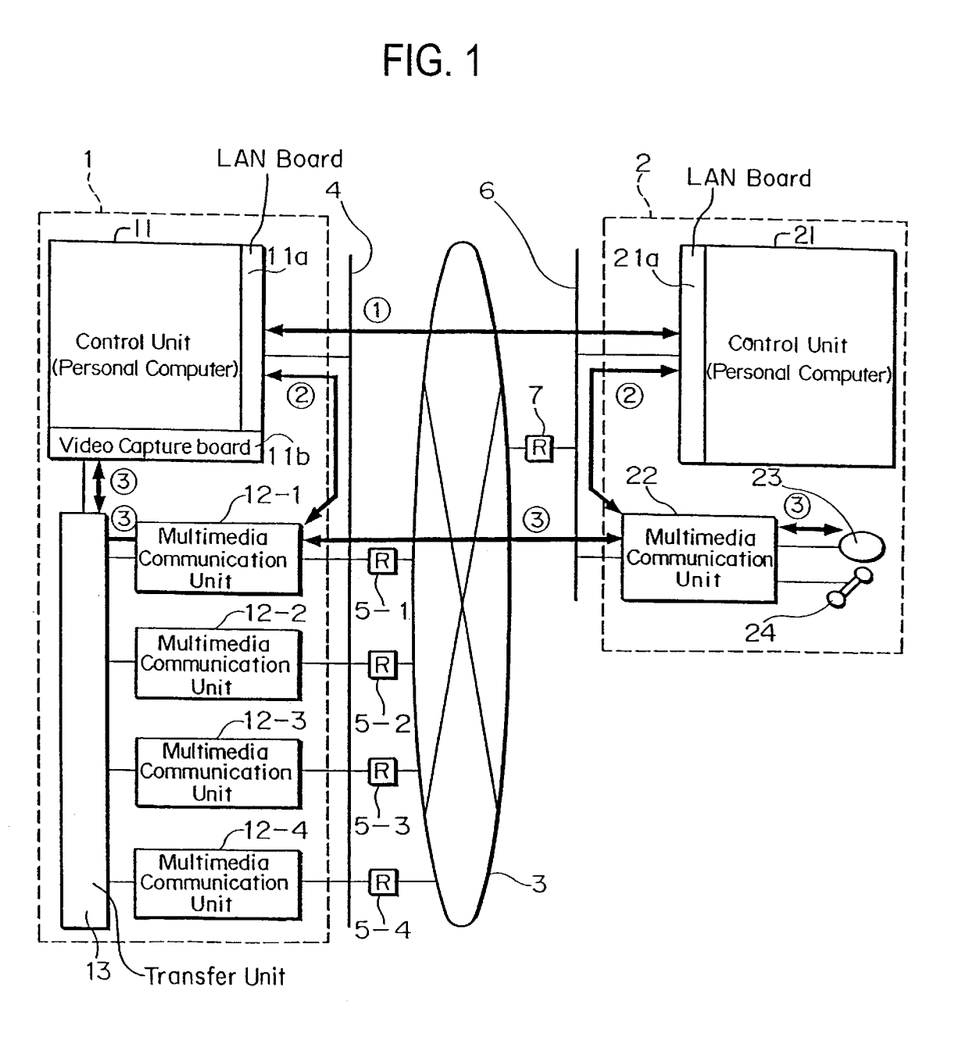
FIG. 1 is a system block diagram of one embodiment of the present invention.

FIG. 1 is a system block diagram of an unmanned automatic contract reception system related to the present invention (hereinafter called a system). As shown in it, the system comprises a center terminal 1 installed in the headquarters or a branch of the host enterprise of a financial company etc. and a client terminal 2 installed in an unmanned shop distant from the center terminal 1, which are interconnected via a communication line 3.

The center terminal 1 comprises: a control unit 11 consisting of for example a personal computer, a LAN board 11a, and a video capture board 11b; for example four multimedia communication units 12-1 through 12-4; and a transfer unit 13 which selectively supplies communication information of those multimedia communication units 12-1 through 12-4 to the control unit 11.

In this center terminal 1, the control unit 11 and each of the multimedia communication units 12-1 through 12-4 can communicate with each other via, for example, a Local Area Network 4 (LAN4). Also, between the LAN4 and a communication line 3 are positioned four routers (R)5-1 through (R)5-4 which correspond to the multimedia communication units 12-1 through 12-4 respectively. The multimedia communication units 12-1 through 12-4 serve as relay resources of the center terminal during communication.

The client terminal 2 on the other hand comprises: a control unit 21 consisting of for example a personal computer and a LAN board 21a; a multimedia communication unit 22; a camera 23 which images clients; and a handset 24 (a set of a receiver and a transmitter) for calling. In the client terminal 2, the control unit 21 and the multimedia communication unit 22 are connected in each other through a LAN 6. Also, between the LAN 6 and a communication line 3, a router 7 is positioned.

An unmanned automatic contract reception system having the above-mentioned configuration will transfer ordinary data including input data and the data read out with a scanner, between the control unit 11 at the center terminal 1 and the control unit 21 at the client terminal 2, via a route (1) shown in the figure. At the center terminal 1 and the client terminal 2, the multimedia communication units 12-1 through 12-4 and the multimedia communication unit 22 are controlled by the commands sent from the control units 11 and 21 respectively, using a route (2) shown in the figure.

Also, image data from the camera 23 and speech data from the handset 24 at the client terminal 2 are sent from the multimedia communication unit 22 to each of the multimedia communication units 12-1 through 12-4 and then to the control unit 11 via the transfer unit 13, using a route (3) in the figure.

The following will specifically describe a variety of embodiments which actually operate an unmanned automatic contract reception system having the above-mentioned configuration.

First Embodiment

Figure 2:
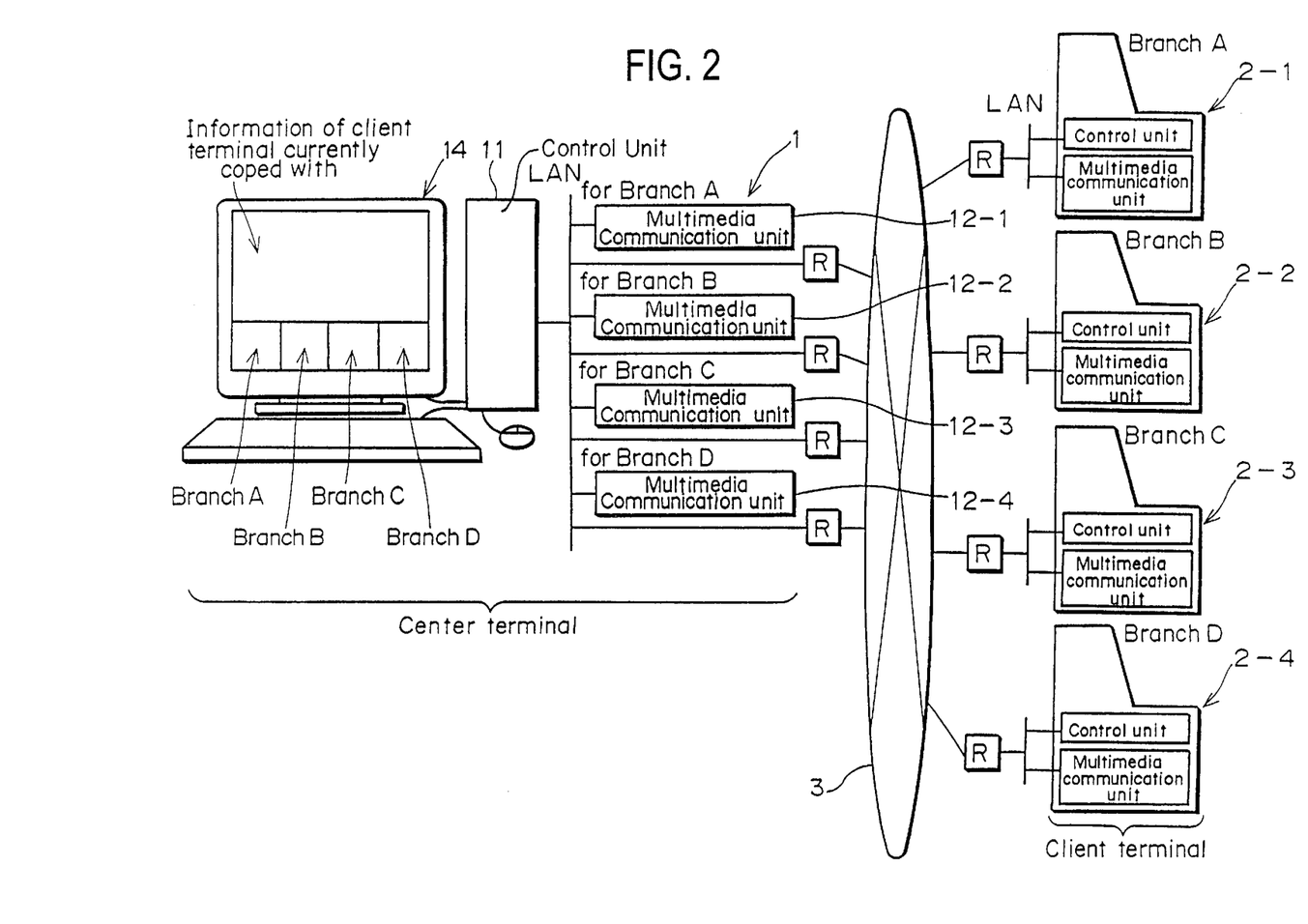
FIG. 2 is a system block diagram of a first embodiment.

FIG. 2 is a system block diagram of a first embodiment. This first embodiment provides a system having: a center terminal 1 comprising, for example, four multimedia communication units 12-1 through 12-4; and another four connectable client terminals 2-1 through 2-4, in such a way that those units and terminals are assigned to each other in a fixed relationship of 1:1.

That is, supposing that the four client terminals 2-1 through 2-4 are installed in branches A, B, C, and D respectively, those client terminals will correspond to the multimedia communication units 12-1 through 12-4 at the center terminal 1 respectively. Those multimedia communication units 12-1 through 12-4 receive image data and speech data sent via the communication line 3 from the client terminals 2-1 through 2-4 respectively.

The center terminal 1 has a control unit 11 and a display unit 14 as well as the four client terminals 2-1 through 2-4. It is also equipped with a client terminal management information file (not shown), which stores the addresses and other management information of the client terminals 2-1 through 2-4. The display unit 14 shows the information of any client terminal currently coped with as well as its installation branch name of A, B, C, or D.

Next, the following will describe, with reference to the flowchart in FIG. 3, the contract reception procedures at the center terminal 1 and the client terminals 2-1 through 2-4 for establishing communication between the center terminal 1 and each of the multimedia communication units on the side of the client terminals 2-1 through 2-4.

Figure 3A:
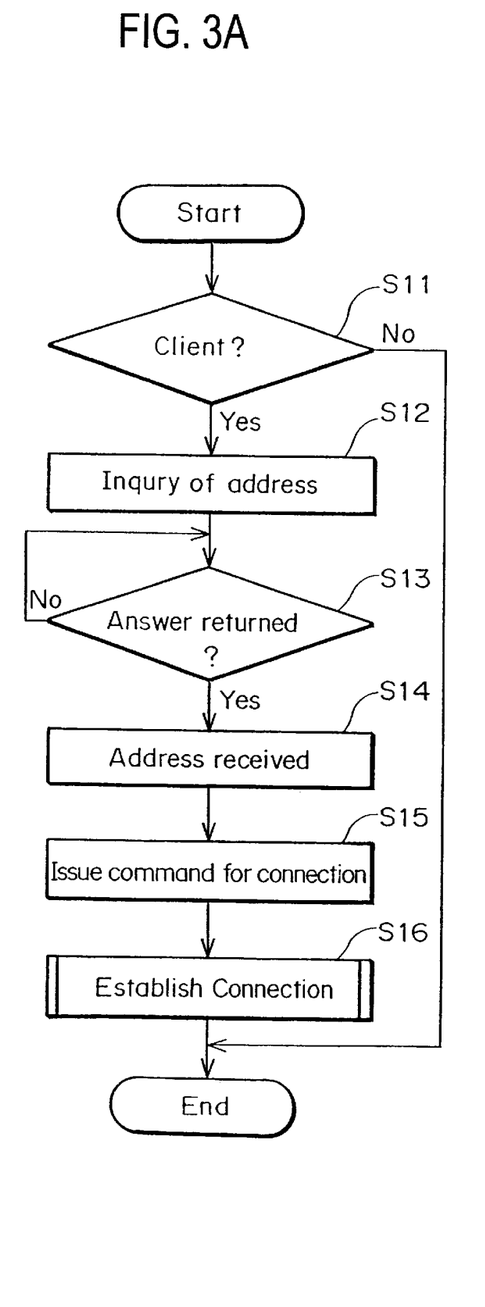
FIG. 3 is a flowchart illustrating a procedure of processing at a client terminal A and a center terminal B related to the first embodiment.

First, in the flowchart of FIG. 3A showing the procedure for the processing on the side of the client terminals 2-1 through 2-4, each control unit at the client terminals 2-1 through 2-4, which corresponds to the control unit 21 in FIG. 1, always monitors the existence of clients (step S11) using a sensor equipped to each of the client terminals 2-1 through 2-4, so that if a client is sensed, the control unit posts it to the center terminal 1 together with the concerned terminal's name, address, and other necessary information and then makes an inquiry for the address of a multimedia communication unit to be connected (step S12). That is, connection-destination information is requested from the center terminal 1. Then, the system waits for a response from the center terminal 1 (step S13).

Figure 3B:
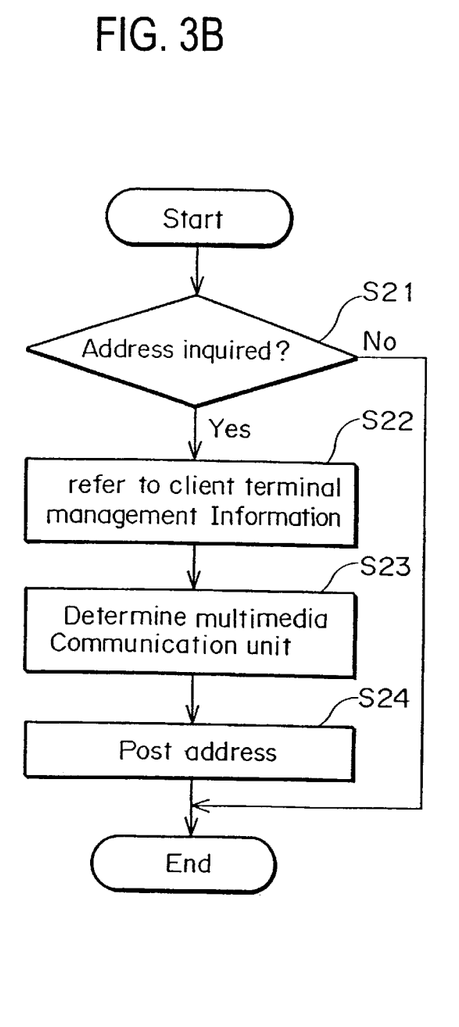

At step S14, when having received the address information, the system, based on the address posted from the center terminal 1 as that of a multimedia communication unit to be connected, issues to its own multimedia communication unit (corresponding to the multimedia communication unit 22 in FIG. 1) a command asking for connection with the center terminal 1's specified multimedia communication unit (step S15). Then, the system establishes communication with the multimedia communication unit specified by the center terminal 1 (step S16). In the flowchart of FIG. 3B showing the procedure at the center terminal 1 on the other hand, the control unit 11 on the side of the center terminal 1 always waits for an inquiry for the address of a desired multimedia communication unit made from any of the client terminals 2-1 through 2-4 (step S21) and, when having received one, the system references the client terminal management information stored in the client terminal management information file (step S22).

This client terminal management information file stores, for example, the client terminals' names and the corresponding multimedia communication units' address data such as listed in Table 1 below.

TABLE 1

| Item No. | Client terminal No. | Address of corresponding multimedia communication unit on the side of center terminal | Other information of shop No. etc. |
|---|---|---|---|
| 1 | Client 01 | 123.123.123.101 | |
| 2 | Client 02 | 123.123.123.102 | |
| 3 | Client 03 | 123.123.123.103 | |
| 4 | Client 04 | 123.123.123.104 | |

Based on the information sent from the client terminal 2-1, the system references the client terminal management information stored in the client terminal management information file, to decide one of the multimedia communication units assigned fixedly to each of the client terminals 2-1 through 2-4 as the one to be connected (step S23), and then posts its address to the client terminals 2-1 through 2-4 (step S24).

Figure 4:
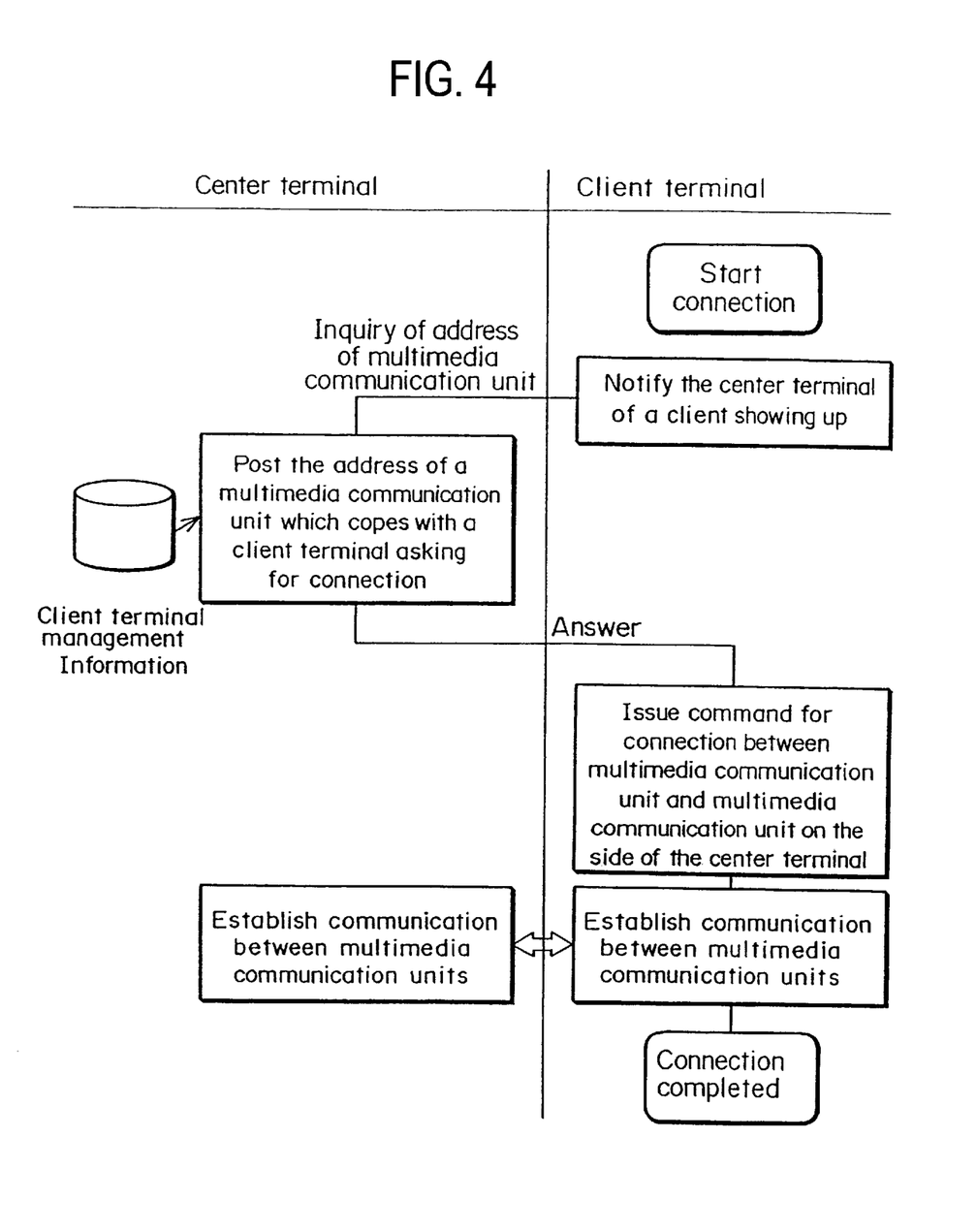
FIG. 4 is a sequence diagram of processing related to the first embodiment.

A sequence illustrating the above-mentioned processing is shown in FIG. 4. With reference to this processing sequence diagram, the following will describe a flow of processing in the case where a client comes to, for example, branch A.

First, the client comes to branch A and is detected by the sensor at the client terminal 2-1, which then posts it to the center terminal 1. Also, the client terminal 2-1 sends its own name and address and, at the same time, makes an inquiry for the address of a multimedia communication unit to be connected. In response to this inquiry, the center terminal 1 references the client terminal management information stored in the client terminal management information file, to decide based on the information sent from the client terminal 2-1 the multimedia communication unit 12-1 which corresponds to the client terminal 2-1 and then posts its address to the client terminal 2-1.

The client terminal 2-1 checks the address posted from the center terminal 1, to issue a command asking for connection with the multimedia communication unit 12-1 of the center terminal 1, to its own multimedia communication unit, which corresponds to the multimedia communication unit 22 in FIG. 1. This series of processing establishes communication between a multimedia communication unit on the side of the center terminal 1 and one on the side of the client terminal 2-1.

Then, the client terminal 2-1 sends via the communication line 3 to the center terminal 1 the input data of the pictures on application forms or driver's licenses read in with a scanner, the image data of the client obtained with the camera 23, and the speech data obtained with the handset 24, while on the other hand the center terminal 1 sends the examination results to the client terminal 2-1, thus completing the procedure necessary for a contract.

In the same way as with the client terminal 2-1, at any of the client terminals 2-2 through 2-4 also, when a client shows up, an inquiry is made to the center terminal 1 for the address of a multimedia communication unit to be used, while on the other hand the center terminal 1 checks the names and other information of the client terminals 2-2 through 2-4, to decide a multimedia communication unit to be connected and post it to the client terminals 2-2 through 2-4, which then perform necessary processing for interconnection between multimedia communication units according to this posted address.

As mentioned above, an unmanned automatic contract reception system related to the first embodiment assigns each of the resources on the side of the center terminal 1, which are, in this case, a viewing area on the display unit 14 and any of the multimedia communication units 12-1 through 12-4 at a client terminal to be connected, to the client terminals 2-1 through 2-4 in a fixed manner. Thus, this system provides such a configuration that one center terminal 1 can be connected to client terminals 2-1 through 2-4 as many as a number of the resources simultaneously, thereby reducing the number of the center terminals required, as compared to the conventional configuration where the center terminals and the client terminals are interconnected in a relationship of 1:1.

Since it assigns a plurality of client terminals to one center terminal in a fixed manner, this system will always keep communication between multimedia communication units on the side of the center terminal 1 and those on the side of the client terminal 2-1, thus being effective for comparatively heavy traffic. Moreover, this system indicates the information sent from the client terminals 2-1 through 2-4 in the same viewing area on the display unit 14, thus reducing the possibility of an operator mistake at the center terminal 1 and improving the operability.

Second Embodiment

Figure 5:
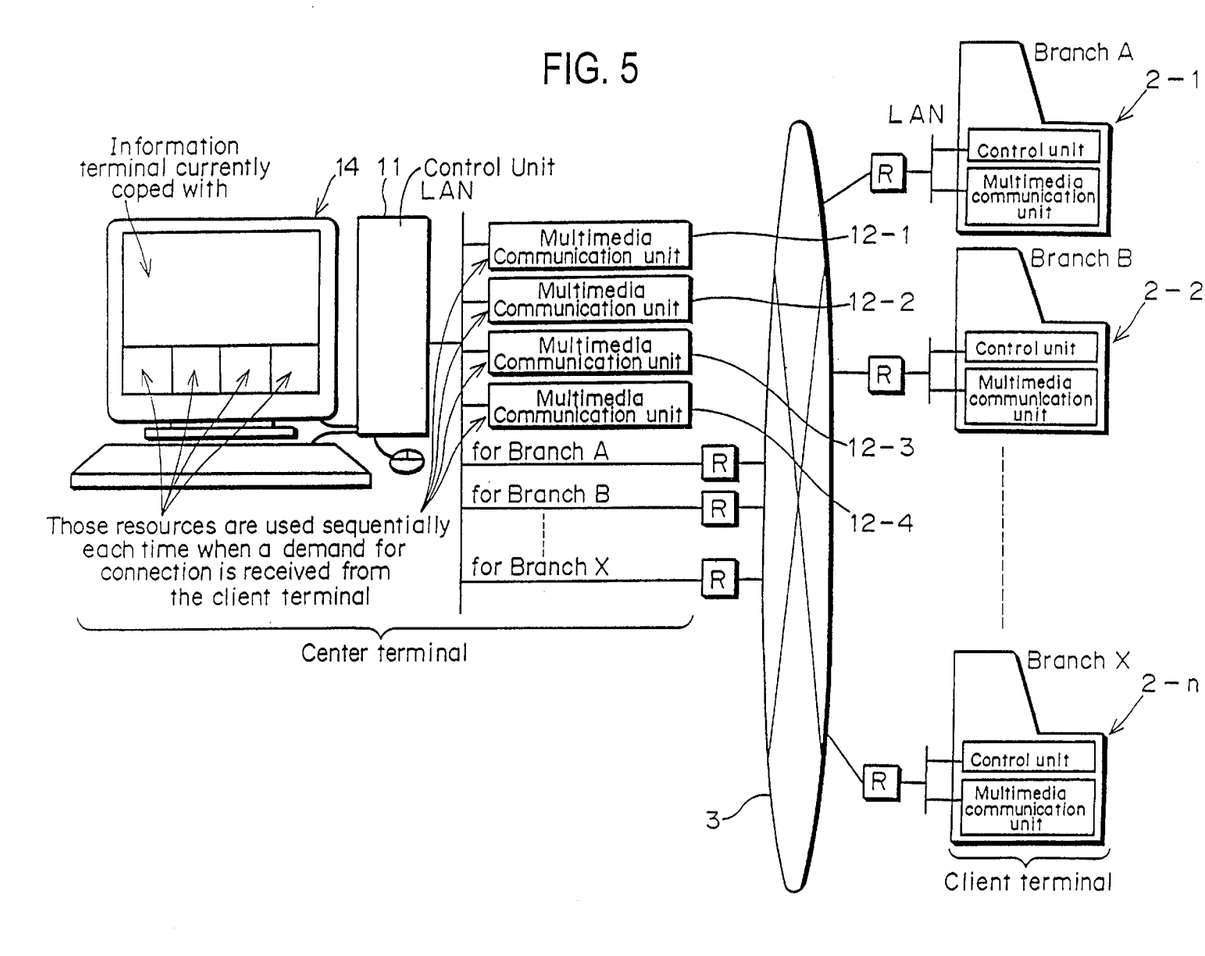
FIG. 5 is a system block diagram of a second embodiment.

FIG. 5 is a system block diagram related to a second embodiment. This second embodiment provides, for example, four multimedia communication units 12-1 through 12-4 to a center terminal 1 as against n number of client terminals 2-1 through 2-n (n>4), to assign all of those n number of client terminals to any selected one of the four multimedia communication units 12-1 through 12-4 in a dynamic manner.

That is, supposing that a number n of client terminals 2-1, 2-2, 2-3, . . . , 2-n are installed in branches A, B, . . . , X, each of the client terminals 2-1, 2-2, . . . , 2-n for the branches A, B, . . . , X can be assigned to any of the multimedia communication units on the side of the center terminal 1 in a dynamic manner. In this configuration, the multimedia communication units 12-1 through 12-4 process image data and speech data sent from those client terminals 2-1 through 2-n via a communication line 3.

As shown in FIG. 5, the center terminal 1 is provided with a control unit 11 and the four client terminals 2-1 through 2-4 as well as a display unit 14. On top of those, it also has a multimedia communication management information file (not shown), which stores such management information including the addresses of the multimedia communication units. The display unit 14 indicates thereon the information of a client terminal coped with currently as well as whether it is branch A, B, . . . , or X.

Figure 6A:
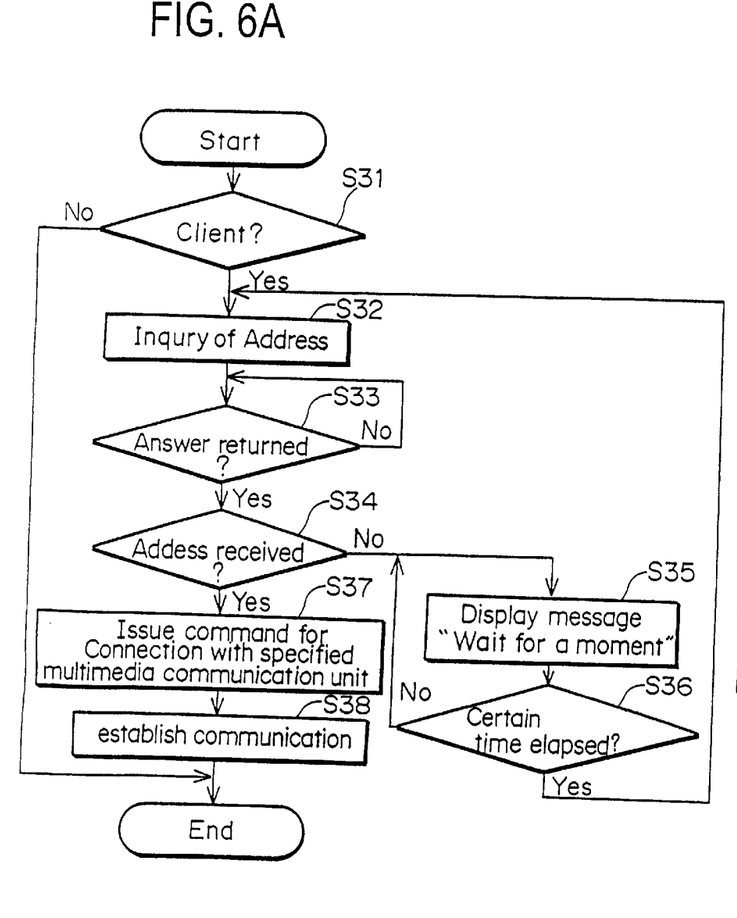
FIG. 6 is a flowchart illustrating a procedure of processing at a client terminal A and a center terminal B related to the second embodiment.

The following will describe, with reference to a flowchart in FIG. 6A, the procedure that the center terminal 1 and the client terminals 2-1 through 2-n perform during processing until an unmanned automatic contract reception system related to this second embodiment establishes communication necessary in contract reception between the center terminal 1 and those client terminals 2-1 through 2-n.

First, in the flowchart of FIG. 6A showing a processing procedure on the side of client terminals 2-1 through 2-4, the control unit of each of the client terminals 2-1 through 2-4 (which corresponds to the control unit 21 in FIG. 1) always monitors the existence of clients with a sensor at the client terminal (step S31) and, if a client shows up, posts it to the center terminal 1 together with the name and the address of the terminal and makes an inquiry for the address of a multimedia communication unit to be connected (step S32). Then, the control unit waits for an answer from the center terminal 1 (step S33).

When having received an answer from the center terminal 1, the control unit first decides whether that received data refers to the address posted as that of the multimedia communication unit to be connected (step S34) and, if they do not agree, it recognizes that answer to be busy information returned from the center terminal 1 and gives a message, for example, "Wait a moment" (step S35), letting the client wait. When a certain period of time has elapsed, the control unit returns to the step S32, to make an inquiry again to the center terminal 1, making an inquiry for the address of a multimedia communication unit to be connected.

At step S34, when having received address information, based on the address posted from the center terminal 1 as that of a multimedia communication unit to be connected, the control unit issues a command asking for connection with the specified multimedia communication unit of the center terminal 1, to its own multimedia communication unit, which corresponds to the multimedia communication unit 22 shown in FIG. 1 (step S37). Then, the control unit establishes communication with the multimedia communication unit specified by the center terminal 1 (step S38).

Figure 6B:
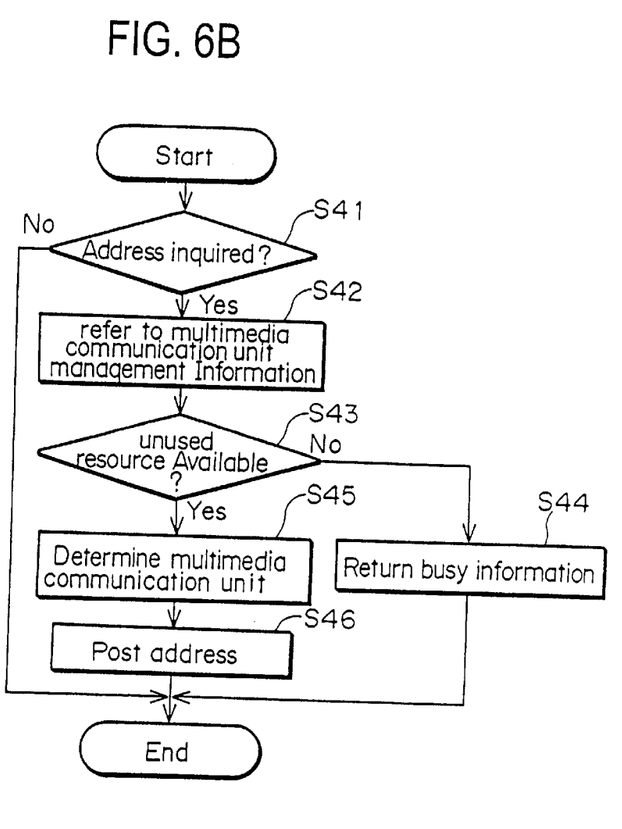

In the flowchart of FIG. 6B showing a processing procedure by the center terminal 1, its control unit 11 always waits for an inquiry from the client terminals 2-1 through 2-4 asking for the address of a multimedia communication unit (step S41) and, if having received one, it references the multimedia communication unit management information stored in the multimedia communication unit management information file (step S42). This multimedia communication unit management information file stores, for example, the names and other identification information of client terminals currently connected as against multimedia communication units of the center terminal, such as listed in Table 2 below.

TABLE 2

| Item No. | Address of multimedia communication unit on the side of center terminal | Name of client terminal currently connected | Other information, e.g. connection status |
|---|---|---|---|
| 1 | 123.123.123.101 | Client 03 | |
| 2 | 123.123.123.102 | (Not connected) | |
| 3 | 123.123.123.103 | (Not connected) | |
| 4 | 123.123.123.104 | (Not connected) | |

Based on information sent from the client terminals 2-1 through 2-4, the control unit 11 references the multimedia communication unit management information stored in its file, to decide whether there are any free (unused) multimedia communication units available (step S43). If, here, there are no unused multimedia communication units available, the control unit 11 sends back information (busy information) to the client terminals 2-1 through 2-4 to that effect (step S44).

If, at the step S43, it has decided that there are some unused multimedia communication units available, the control unit 11 sets one of them as a multimedia communication unit to be connected with the client terminals 2-1 through 2-4 (step S45), and posts the address of that multimedia communication unit to the client terminals 2-1 through 2-4 (step S46).

Figure 7:
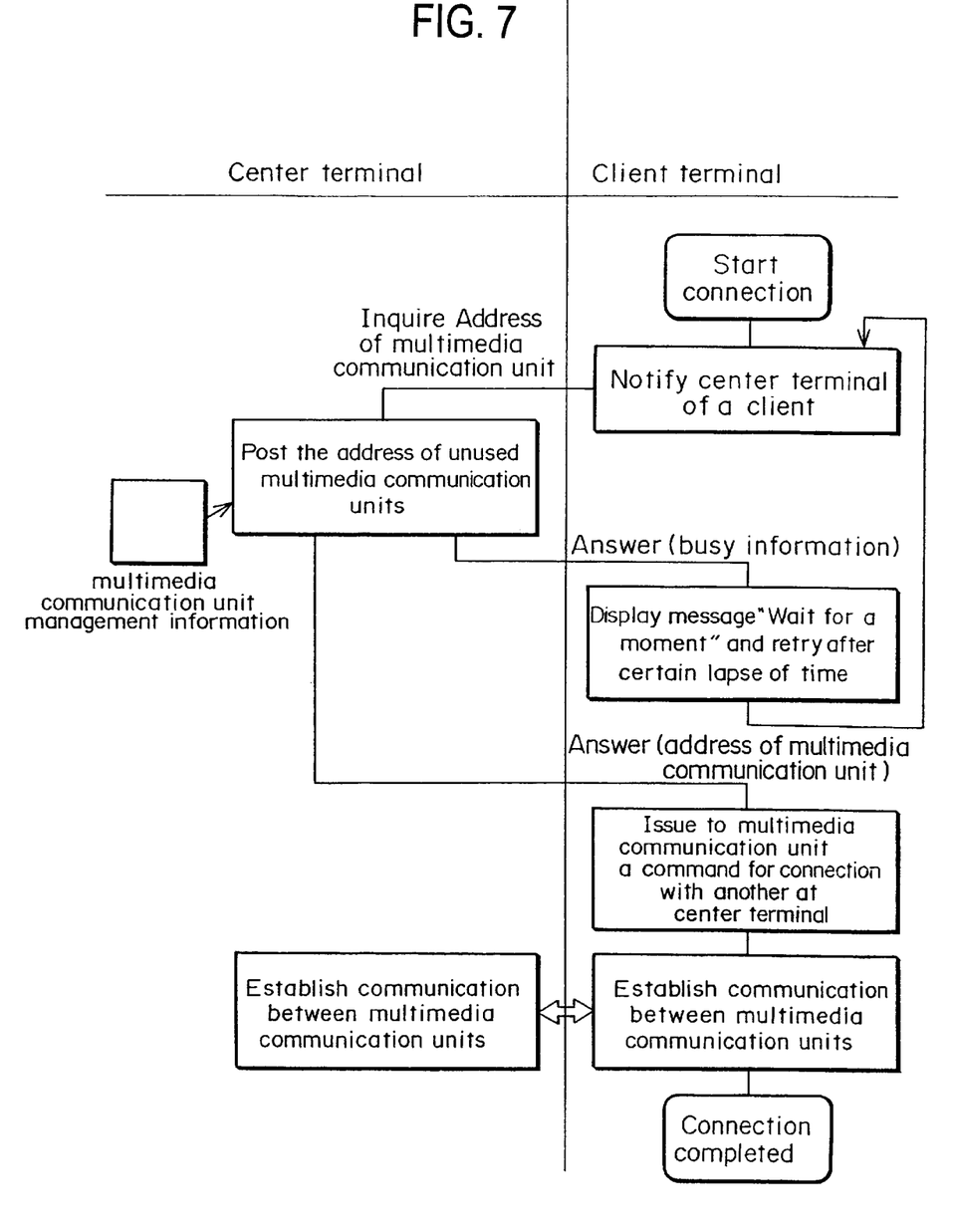
FIG. 7 is a sequence diagram of processing related to the second embodiment.

The above-mentioned sequence of processing is shown in FIG. 7. Along this sequence of processing in FIG. 7, the following will describe a series of processes in the case, for example, where a client shows up at branch A.

First, a client comes to the branch A and is sensed by a sensor at the client terminal 2-1, which then posts it to the center terminal 1. At the same time, the client terminal 2-1 sends its own name, address, and other necessary information and also makes an inquiry for the address of a multimedia communication unit to be connected. Then, the center terminal 1 references the multimedia communication unit management information stored in the multimedia communication unit management information file, to decide whether there are any free (unused) multimedia communication units available.

If there are no unused multimedia communication units available, the center terminal 1 sends back information (busy information) to the client terminal 2-1. In response to this, the client terminal 2-1 gives a message, for example, "Wait a moment" to let the client wait until the resources are released. Display of this message tells that the client is waiting, eliminating the needs of entering unnecessary data.

When a certain lapse of time has elapsed after that, an inquiry is made again to the center terminal 1 asking for the address of a multimedia communication unit to be connected.

If there are some unused multimedia communication units available, the center terminal 1 posts the address of one of them to the client terminal 2-1. In response to this, the client terminal 2-1 issues a command asking for connection with the multimedia communication unit specified by the center terminal 1 to its own multimedia communication unit, which corresponds to the multimedia communication unit 22 in FIG. 1. This series of processes establish communication between one multimedia communication unit on the side of the center terminal 1 and another on the side of the client terminal 2-1.

Subsequently, the client terminal 2-1 sends via the communication line 3 the input data of the pictures on application forms or driver's licenses read in with the scanner, the image data obtained with the camera 23, and the speech data obtained with the handset 24, to the center terminal 1, while the center terminal 1 sends back the examination results to the client terminal 2-1, thus executing the steps of the contract procedure.

At the center terminal 1, the multimedia communication unit thus used is released when the procedure has been finished, waiting for a connection demand from other client terminals. The released multimedia communication unit is cataloged as being unused in the multimedia communication unit management information file.

In the same way as with the case for the client terminal 2-1, for the client terminals 2-2 through 2-n also, if a client shows up, the client terminal makes an inquiry to the center terminal 1 for the address of a multimedia communication unit to be connected. In response to this, the center terminal 1 references the multimedia communication unit management information stored in the multimedia communication unit management information file, to set one of the unused multimedia communication units as the one to be connected and then posts its address to the relevant one of the client terminals 2-2 through 2-n. In response to this, the client terminal performs processing necessary for interconnection between the multimedia communication units, according to thus posted address.

With this, an unmanned automatic contract reception system related to the second embodiment will dynamically assign a client terminal at which a client has shown up, to each of the resources at the center terminal 1 (which are here the viewing area on the display unit 14, the multimedia communication units 12-1 through 12-4, and other resources necessary for each client terminal connected) in such a manner that the center terminal 1 can be connected simultaneously with many client terminals, thereby decreasing the number of required center terminals as compared to the conventional construction where the center terminals and the client terminals are interconnected in a relationship of 1:1.

Also, this system of dynamically assigning a plurality of client terminals to one center terminal can establish communication between multimedia communication units on the side of the center terminal 1 and those on the side of the client terminal 2-1 only on condition that there are some unused resources available, so that it is effective for a comparatively small traffic. This system, however, requires a small number of center terminals against rather many client terminals, to compared to the first embodiment, thereby being effective in reducing the hardware introduction cost and the installation space required. Moreover, this system is advantageous in that malfunctioning multimedia communication units, if any, on the side of the center terminal 1 can be replaced with other normal units.

Although the above-mentioned embodiments have been described with the case where a plurality of client terminals are controlled in an unmanned automatic contract reception system, the present invention is not limited to the application to unmanned automatic contract reception systems but is applicable also to overall systems having such a construction that one center terminal has control over a plurality of terminals.

As mentioned above, the present invention provides a center terminal with the same number of resources as a plurality of terminals, to assign, in connection, those plurality of terminals to each of the resources at the center terminal in a fixed manner. This system, therefore, requires a smaller number of center terminals than the conventional systems where the center terminal and a plurality of terminals are connected in a relationship of 1:1, thus reducing the hardware introduction cost and the installation space required.

Also, this novel system provides a center terminal with a smaller number of resources than a plurality of terminals, to assign the plurality of terminals to each of the resources at the center terminal in a dynamic manner. This novel system, therefore, only needs a small number of center terminals as compared to the conventional systems where the center terminals and the plurality of terminals are connected in a relationship of 1:1, thus reducing the hardware introduction cost and the installation space required.

Although the preferred embodiments related to the present invention have been described for the method of establishing multimedia communication connection with reference to the accompanying drawings, the present invention is not limited to those exemplary embodiments. Various modifications will become possible for those skilled in the art after receiving the teachings of the present disclosure without departing from the scope thereof.

The entire disclosure of Japanese Patent Application No. 9-043503 filed on Feb. 27, 1997 including specification, claims, drawings, and summary is incorporated herein by reference in its entirety.

What is claimed is:

1. A method for establishing multimedia communication connection between a plurality of local unmanned automatic contract machines operated by local clients and one center terminal operated by an operator at a host enterprise, comprising the steps of:

by said center terminal, which is provided with a control unit, a plurality of relay resources, and a transfer unit, receiving an inquiry for connection from one of said local unmanned automatic contract machines and returning connection-destination information concerning the relay resource to be connected;

by said one of said local unmanned automatic contract machines making an access to said center terminal via the assigned relay resource, based on said connection-destination information; and by said center terminal, selectively receiving communication information sent by said one of said unmanned automatic contract machines via the assigned relay resources, wherein a contract between a local client at said one of said unmanned automatic contract machines and the host enterprise is achieved through the established communication.

2. The method for establishing multimedia communication connection as claimed in claim 1, wherein said relay resources of the center terminal are connected with said plurality of local unmanned automatic contract machines in a fixed manner that is assigned beforehand.

3. The method of establishing multimedia communication connection as claimed in claim 2, wherein said center terminal holds information concerning the correspondence between each of the relay resources and said plurality of local unmanned automatic contract machines and, when inquired by any of said plurality of local unmanned automatic contract machines for a relay resource to be connected, returns information concerning the corresponding relay resource.

4. The method for establishing multimedia communication connection as claimed in claim 2, wherein said center terminal has the same number of relay resources installed as the number of local unmanned automatic contract machines.

5. The method for establishing multimedia communication connection as claimed in claim 1, wherein said relay resources at the center terminal are connected with said plurality of terminals in a dynamic manner that is established beforehand.

6. The method for establishing multimedia communication connection as claimed in claim 5, wherein said center terminal holds information concerning unused relay resources and, when inquired by any of said plurality of local unmanned automatic contract machines for a relay resource to be connected, returns information concerning the unused relay resources.

7. The method for establishing multimedia communication connection as claimed in claim 5, wherein when there are no unused relay resources available, said center terminal returns information to that effect.

8. The method for establishing multimedia communication connection as claimed in claim 7, wherein when having received an answer to the effect that there are no unused relay resources available, said local unmanned automatic contract machines display a message to that effect.

9. The method for establishing multimedia communication connection as claimed in claim 5, wherein said center terminal has a smaller number of relay resources installed than the number of local unmanned automatic contract machines.

10. A multimedia computer network for establishing multimedia communication connection between a plurality of local unmanned automatic contract machines operated by local clients and one center terminal operated by an operator at a host enterprise, wherein:

said center terminal is provided with a control unit, a plurality of relay resources, and a transfer unit which selectively supplies communication information concerning the relay resources to the control unit; and said each of said plurality of local unmanned automatic contract machines supplies multimedia information to the control unit via one of the relay resources which is allotted to the respective local unmanned automatic contract machine by the control unit in accordance with an access of the respective local unmanned automatic contract machine to the control unit.

11. The multimedia computer network as claimed in claim 10, wherein said relay resources of the center terminal are connected with said plurality of local unmanned automatic contract machines in a fixed manner that is assigned beforehand.

12. The multimedia computer network as claimed in claim 10, wherein said center terminal holds information concerning the correspondence between each of the relay resources and said plurality of local unmanned automatic contract machines and, when inquired by any of said plurality of client terminals for a relay resource to be connected, returns information concerning the corresponding relay resource.

13. The computer network as claimed in claim 10, wherein said center terminal has the same number of relay resources installed as the number of local unmanned automatic contract machines.

14. The computer network as claimed in claim 10, wherein said relay resources at the center terminal are connected with said plurality of local unmanned automatic contract machines in a dynamic manner that is established beforehand.

15. The computer network as claimed in claim 10, wherein said center terminal holds information concerning unused relay resources and, when inquired by any of said plurality of local unmanned automatic contract machines for a relay resource to be connected, returns information concerning the unused relay resources.

16. The computer network as claimed in claim 10, wherein when there are no unused relay resources available, said center terminal returns information to that effect.

17. The computer network as claimed in claim 10, wherein when having received an answer to the effect that there are no unused relay resources available, said local unmanned automatic contract machines display a message to that effect.

18. The computer network as claimed in claim 10, wherein said center terminal has a smaller number of relay resources installed than the number of local unmanned automatic contract machines.

19. A method for communicating, between a local unmanned automatic contract machine and a center terminal having a plurality of relay resources, for achieving a contract between a host enterprise and a client at the local unmanned automatic contract machine, comprising the steps of:

(a) notifying the center terminal when the client at the local unmanned automatic contract machine desires a contract;

(b) at the center terminal, selecting one of the relay resources for communication; while the contract is completed;

(c) sending connection-destination information from the center terminal to the local unmanned automatic contract machine to identify the relay resource selected during step (b);

(d) sending a command, from the local unmanned automatic contract machine to the center terminal, for connecting the client terminal to the relay resource identified by the connection-destination information; and (e) conducting communication between the local unmanned automatic contract machine and the center terminal while the contract is completed via the relay resource identified by the connection-destination information.

20. The method of claim 19, wherein the relay resources of the center terminal comprise communication units having respective addresses, and wherein the connection-destination information comprises the address of the selected communication unit.

21. The method of claim 20, wherein the local unmanned automatic contract machine comprises means for generating video data and at least one other type of data, and wherein the communication units of the center terminal are multimedia communication units.

22. The method of claim 19, wherein said one of the relay resources is selected dynamically in step (b) from among any relay resources that are currently unused.

* * * * *